US010712222B2

(12) United States Patent
Lai

(10) Patent No.: US 10,712,222 B2
(45) Date of Patent: Jul. 14, 2020

(54) AIR PRESSURE AND TEMPERATURE MEASUREMENT SYSTEM

(71) Applicant: IN WIN DEVELOPMENT, INC., Taoyuan Hsien (TW)

(72) Inventor: Wen-Hsien Lai, Taoyuan Hsien (TW)

(73) Assignee: IN WIN DEVELOPMENT, INC., Taoyuan Hsien (TW)

( * ) Notice: Subject to any disclaimer, the term of this patent is extended or adjusted under 35 U.S.C. 154(b) by 200 days.

(21) Appl. No.: 15/935,628

(22) Filed: Mar. 26, 2018

(65) Prior Publication Data
US 2019/0293512 A1 Sep. 26, 2019

(51) Int. Cl.
| G01K 1/00 | (2006.01) |
| G01K 13/00 | (2006.01) |
| G01K 7/00 | (2006.01) |
| G01L 19/00 | (2006.01) |
| G01K 1/02 | (2006.01) |
| G01L 19/12 | (2006.01) |
| G01L 19/08 | (2006.01) |
| G05D 7/06 | (2006.01) |
| G01K 3/06 | (2006.01) |

(52) U.S. Cl.
CPC ......... G01L 19/0092 (2013.01); G01K 1/024 (2013.01); G01L 19/086 (2013.01); G01L 19/12 (2013.01); G01K 3/06 (2013.01); G05D 7/0676 (2013.01)

(58) Field of Classification Search
USPC ................................ 374/143, 208, 141, 166
See application file for complete search history.

(56) References Cited

U.S. PATENT DOCUMENTS

2019/0033897 A1* 1/2019 Barbier .................. G05D 23/00

* cited by examiner

*Primary Examiner* — Mirellys Jagan
(74) *Attorney, Agent, or Firm* — Pro-TECHTOR International Services; Ian Oglesby

(57) ABSTRACT

An air pressure and temperature measurement system of the present invention includes a 90-degree interleaved lattice of metal wires embedded on a frame, wherein a pressure sensor and a temperature sensor are installed at each of the areas where the metal wires are connected to the frame. All the sensor modules are connected to a MCU (microcontroller unit) mounted within the frame. When air driven by fans blows over the reticulated metal wires, the sensor modules use the heat and pressure produced therefrom to enable calculating the temperature and pressure distribution at the fan openings, and then the data is transferred to an external system through a communication interface to perform more precise management and monitoring.

7 Claims, 3 Drawing Sheets

AIR PRESSURE AND TEMPERATURE MEASUREMENT SYSTEM

BACKGROUND OF THE INVENTION

(a) Field of the Invention

The present invention relates to an air pressure and temperature measurement system, specifically to a system which has an application in a server chassis or equipment cabinet, wherein measurements of air pressure and temperature of inlet and outlet airflows produced by fans provide an external management system and more precise data. This data is then used to monitor air pressure conditions to detect the occurrence of airflow hindrances or inadequate air speeds, as well as, determine the distribution of temperature and air pressure at fan openings to achieve increasing fan efficiency and more precise control.

(b) Description of the Prior Art

Current server or computer heat dissipation systems generally use temperature sensor modules, which transmit detected temperature signals to a MCU (microcontroller unit) for further collation to obtain the working temperature conditions, which is then used to control the rotational speeds of fans to ensure the system is always operating within a specified system operating temperature range. Referring to FIG. 1, which shows a heat dissipation system of the prior art, wherein the airflow direction produced by external fans simultaneously form forced convection of air towards the interiors of a Server 1, a Server 2, and a Server 3 to achieve the object of heat dissipation. However, all fans have a certain operating life, and there is the likelihood of potentially different levels of mechanical failure occurring due to differences in manufacturing quality, thus resulting in inconsistent heat dissipation effectiveness and causing somewhat different windage and heat generation within the interior of each server. Moreover, an external management system is necessary to obtain the operating temperature within the interior of each server, and only after calculations are carried out is the system able to control the rotational speeds of the fans. However, existing servers are unable to detect circumstances such as the occurrence of fan obstructions or inadequate air speeds. Accordingly, there is the need for a more feasible invention that resolves the above shortcomings.

SUMMARY OF THE INVENTION

The primary objective of the present invention is to provide an air pressure and temperature measurement system designed with more than one set of metal wires that forms a 90-degree interleaved lattice embedded on a frame. A pressure sensor and a temperature sensor are mounted at each of the areas where the metal wires are connected to the frame, and all the sensor modules are connected to a microcontroller unit mounted within the frame. When air driven by fans blows over the reticulated metal wires, the sensor modules use the heat and pressure produced therefrom to enable calculating the temperature and pressure distribution at the fan openings, and then the data is transferred to an external system through a communication interface to perform more precise management and monitoring to enable increasing the entire efficiency.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
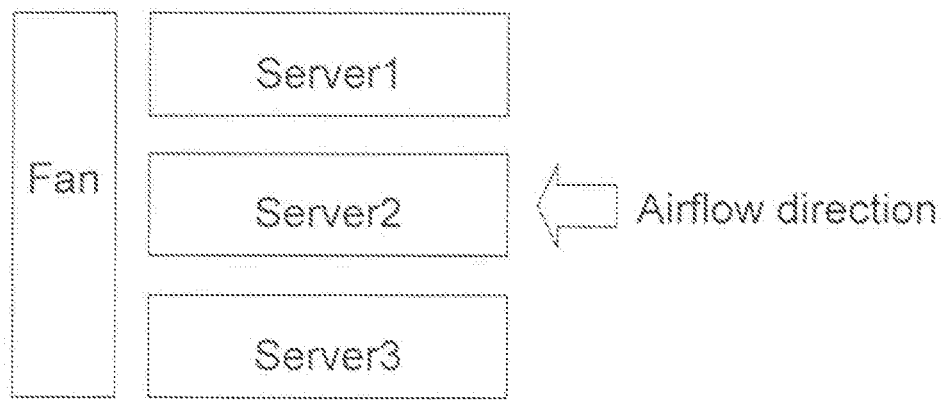
FIG. 1 shows a schematic view of a heat dissipation system of the prior art.
Figure 2:
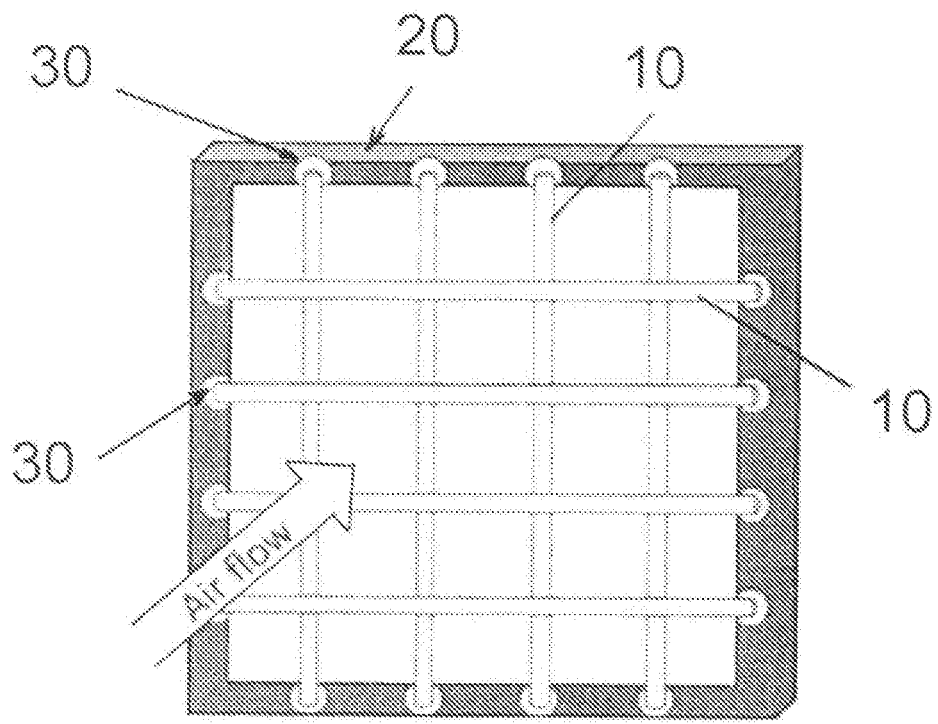
FIG. 2 shows a schematic diagram of the embodiment of the present invention.
Figure 3:
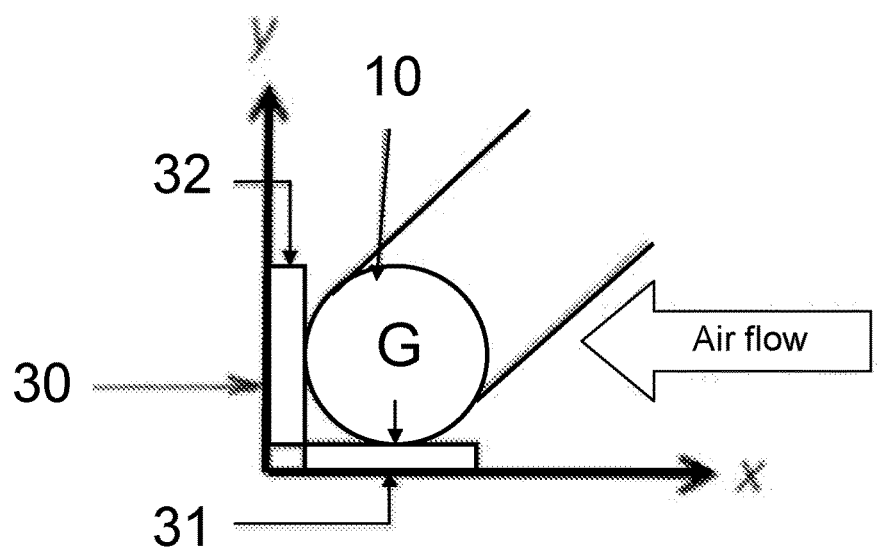
FIG. 3 shows a schematic view of the sensor module and metal wires of the present invention.
Figure 4:
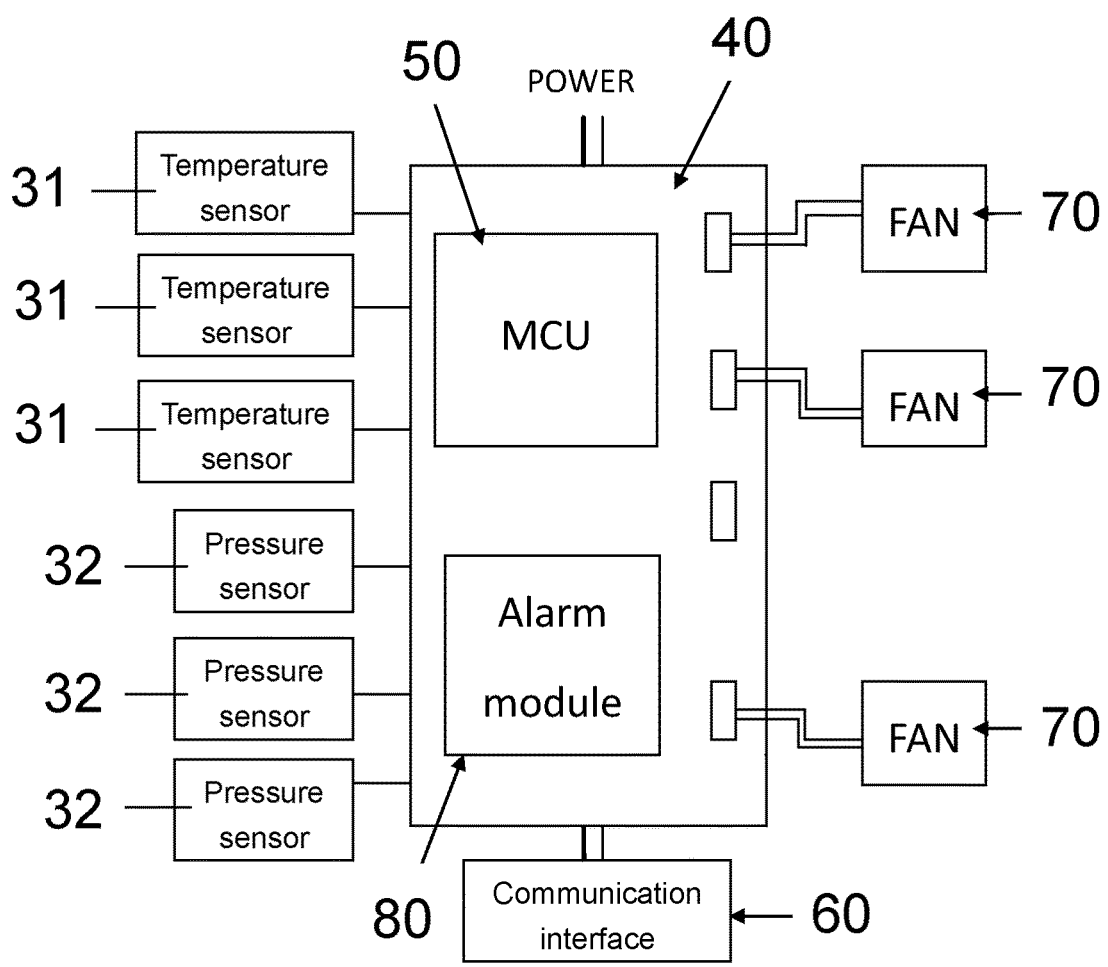
FIG. 4 shows a circuit block diagram of the embodiment of the present invention.
Figure 5:
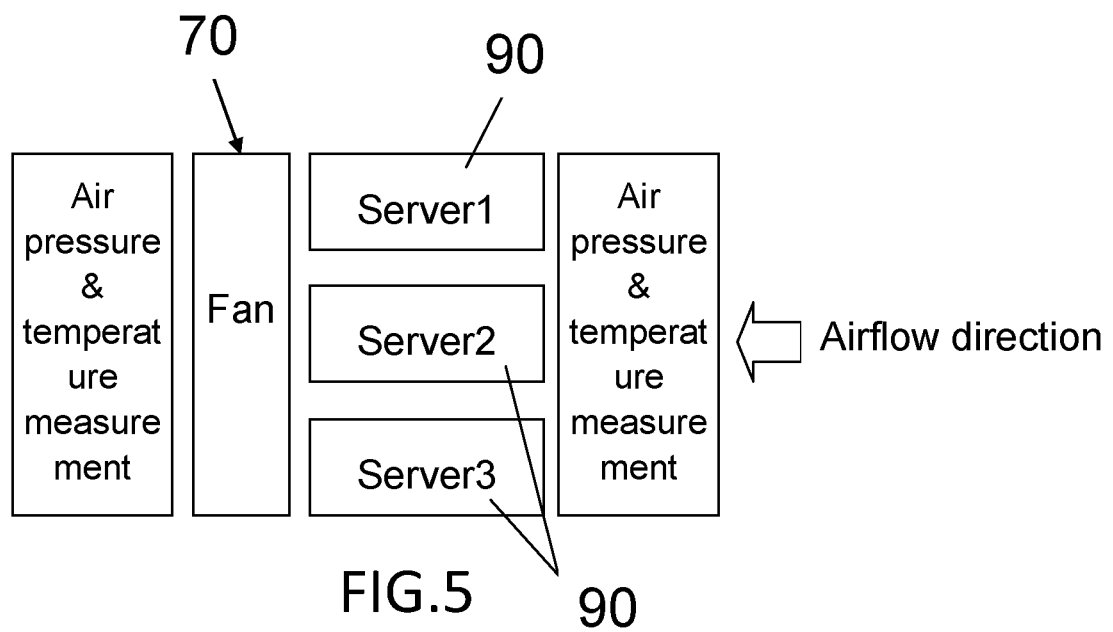
FIG. 5 shows a schematic view of a fan control system of the present invention.

Referring to FIG. 2, the air pressure and temperature measurement system of the present invention comprises primarily of: more than one set of metal wires 10, a frame 20, and at least one sensor module 30. The metal wires 10 are combined and connected to a frame 20 using a 90-degree, interleaved lattice method to form a lattice frame. A sensor module 30 is mounted at each of the areas where the metal wires 10 are connected to the frame 20. Referring to FIG. 3, each of the sensor modules 30 is structured from a temperature sensor 31 and a pressure sensor 32, which assumes a perpendicular angle in contact with the metal wire 10. Referring to FIG. 4, a circuit board 40 is mounted inside the frame 20, and an MCU (microcontroller unit) 50 is mounted at an appropriate location on the circuit board 40. All of the temperature sensors 31 and the pressure sensors 32 are connected to the microcontroller unit 50 through the circuit board 40. One end of the circuit board 40 is connected to a communication interface 60, wherein the communication interface 60 is either an USB (Universal Serial Bus), an I2C (Inter-Integrated Circuit), a SPI (serial peripheral interface), a WIFI (Wireless Fidelity), or an Ethernet. The communication interface 60 enables an external management system to access temperature and pressure data from the sensor modules 30. Fan control interfaces can also be mounted on the circuit board 40 and connected to a plurality of fans 70, to enable direct control of the rotational speed of the fans 70. In addition, an alarm module 80 can also be connected inside the circuit board 40, wherein the alarm module 80 uses an LED (light-emitting diode) or a buzzer to provide related warnings that enable notifying external management. Referring to FIG. 5, the air pressure and temperature measurement system of the present invention apart from being able to install a plurality of servers 90 at the front end air inlet areas of the fans 70, the servers 90 can also be installed at the rear end air outlet areas of the fans 70, or the servers 90 are concurrently installed at the front end air inlets and the rear end air outlets. Such a configuration enables determining the temperature and pressure distribution differences of the fans 70 and locating the paths of air flow hindrances and hot air flows to affect an adjustment function of fan heat dissipation or airflow diversion, thereby enabling increasing the entire efficiency.

In conclusion, according to the above description of the embodiments of the present invention, the air pressure and temperature measurement system, which are combined in a 90-degree interleaved lattice of metal wires on a frame, is used to measure the air pressure and temperature distribution system produced at fan openings, and includes sensor modules mounted at the areas where the metal wires are in contact with the frame. Each of the sensor modules comprises a temperature sensor and a pressure sensor, which are structured to assume a perpendicular angle in contact with the respective metal wire. The aforementioned sensor modules are all connected to a MCU. Accordingly, when air driven by fans blows over the reticulated metal wires, the sensor modules use the heat and pressure produced therefrom to enable calculating the temperature and pressure distribution at the fan openings, and then the data is transferred to an external system to perform more precise management and monitoring.

It is of course to be understood that the embodiments described herein are merely illustrative of the principles of the invention and that a wide variety of modifications thereto may be affected by persons skilled in the art without departing from the spirit and scope of the invention as set forth in the following claims.

What is claimed is:

1. An air pressure and temperature measurement system, comprising:
    more than one set of metal wires, which are combined in a 90-degree interleaved lattice configuration;
    a frame, wherein each end of the metal wires formed from the interleaved lattice configuration is connected to the frame, thereby forming a lattice frame; and
    at least one sensor module, each of the sensor modules comprising a temperature sensor and a pressure sensor which are structured to assume a perpendicular angle with each other and in contact with a respective metal wire of the lattice.

2. The air pressure and temperature measurement system according to claim 1, wherein the temperature sensors and the pressure sensors of the sensor modules are all connected to a microcontroller unit through a circuit board.

3. The air pressure and temperature measurement system according to claim 1, wherein a circuit board is mounted inside the frame, and an MCU (microcontroller unit) is mounted at an appropriate position on the circuit board.

4. The air pressure and temperature measurement system according to claim 3, wherein the temperature sensors and the pressure sensors of the sensor modules are all connected to the microcontroller unit through the circuit board.

5. The air pressure and temperature measurement system according to claim 3, wherein one end of the circuit board is connected to a communication interface, and the communication interface is either a USB (Universal Serial Bus), a UART (Universal Asynchronous Receiver/Transmitter), an I2C (Inter-Integrated Circuit), an SPI (serial peripheral interface), a WIFI (Wireless Fidelity), or an Ethernet.

6. The air pressure and temperature measurement system according to claim 3, wherein at least one fan control interface is mounted on the circuit board and connected to at least one fan.

7. The air pressure and temperature measurement system according to claim 3, wherein an alarm module is connected within the circuit board, and the alarm module comprises light signals, or a buzzer, or a combination of light signals and a buzzer.

* * * * *